US012074533B2

(12) United States Patent
Walley et al.

(10) Patent No.: US 12,074,533 B2
(45) Date of Patent: Aug. 27, 2024

(54) RECTIFIER FAST LOAD BALLAST

(71) Applicant: Avago Technologies International Sales Pte. Limited, Singapore (SG)

(72) Inventors: John Walley, Ladera Ranch, CA (US); Marc Keppler, Windsor, CO (US); Jim Le, Fort Collins, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 101 days.

(21) Appl. No.: 17/877,525

(22) Filed: Jul. 29, 2022

(65) Prior Publication Data
US 2024/0039424 A1 Feb. 1, 2024

(51) Int. Cl.
*H02M 7/217* (2006.01)
*H02J 50/10* (2016.01)
*H02M 1/32* (2007.01)
*H04L 27/04* (2006.01)

(52) U.S. Cl.
CPC .......... *H02M 7/217* (2013.01); *H02J 50/10* (2016.02); *H02M 1/32* (2013.01); *H04L 27/04* (2013.01)

(58) Field of Classification Search
CPC .......... H02M 7/217; H02M 1/32; H02J 50/10; H04L 27/04
See application file for complete search history.

(56) References Cited

U.S. PATENT DOCUMENTS

| | | | |
|---|---|---|---|
| 6,825,620 B2 | 11/2004 | Kuennen et al. | |
| 8,134,845 B2 | 3/2012 | Cheng | |
| 8,320,143 B2 | 11/2012 | Leibovitz | |
| 9,661,444 B2 | 5/2017 | Lefley | |
| 10,122,217 B2 | 11/2018 | Hrinya et al. | |
| 10,218,225 B2 | 2/2019 | Desrosiers | |
| 10,256,669 B2 | 4/2019 | Osada et al. | |
| 10,439,437 B2 | 10/2019 | Baarman | |
| 10,476,302 B2 | 11/2019 | Walley et al. | |
| 10,734,842 B2 | 8/2020 | Karalis et al. | |
| 10,978,899 B2 | 4/2021 | Qiu et al. | |
| 10,998,776 B2 | 5/2021 | Chen et al. | |
| 2019/0149060 A1* | 5/2019 | Tritschler | H02M 7/219 307/31 |
| 2020/0328630 A1* | 10/2020 | Chen | H02J 7/02 |
| 2022/0200362 A1* | 6/2022 | Mehrabi | H02J 50/402 |
| 2023/0421145 A1* | 12/2023 | Nelson | H03K 17/687 |

FOREIGN PATENT DOCUMENTS

GB 2465678 A 6/2010

\* cited by examiner

*Primary Examiner* — Jared Fureman
*Assistant Examiner* — Duc M Pham
(74) *Attorney, Agent, or Firm* — Quarles & Brady LLP

(57) ABSTRACT

A rectifier modulates a signal in a rectifier by turning on a low side field effect transistor to produce a load at a coil network in response to a low side field effect transistor in an alternative diagonal being on. The system measures signal quality to determine a necessary modulation depth for ASK communication; then determines a switching time and magnitude of a ballast signal to apply to the low side field effect transistor to achieve that modulation depth.

17 Claims, 3 Drawing Sheets

RECTIFIER FAST LOAD BALLAST

BACKGROUND

Wireless power transfer systems utilizing the power transfer link for communication include modems that require modulation depth for fast, accurate communication. Typically, amplitude shift keying (ASK) modulation in wireless power transfer systems requires switching capacitors (capacitive load modulation) in the rectifier coil network, or adjusting a load on the rectifier output (for example, constant current load modulation) to force communications. Capacitive modulation is power friendly but can introduce instability, requires extra components and is not flexible for multi-frequency systems. Load modulation on the rectifier output is slow, prohibiting high speed communication.

It would be advantageous to have a system and method for ASK modulation that did not impact the rectified voltage ($V_{RECT}$) or system stability, or throttle communication speed.

SUMMARY

In one aspect, embodiments of the inventive concepts disclosed herein are directed to a system and method for modulating a signal in a rectifier by turning on a low side field effect transistor to produce a load at a coil network in response to a low side field effect transistor in an alternative diagonal being on.

In a further aspect, the system measures signal quality to determine a necessary modulation depth for ASK communication; then determines a switching time and magnitude of a ballast signal to apply to the low side field effect transistor to achieve that modulation depth.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
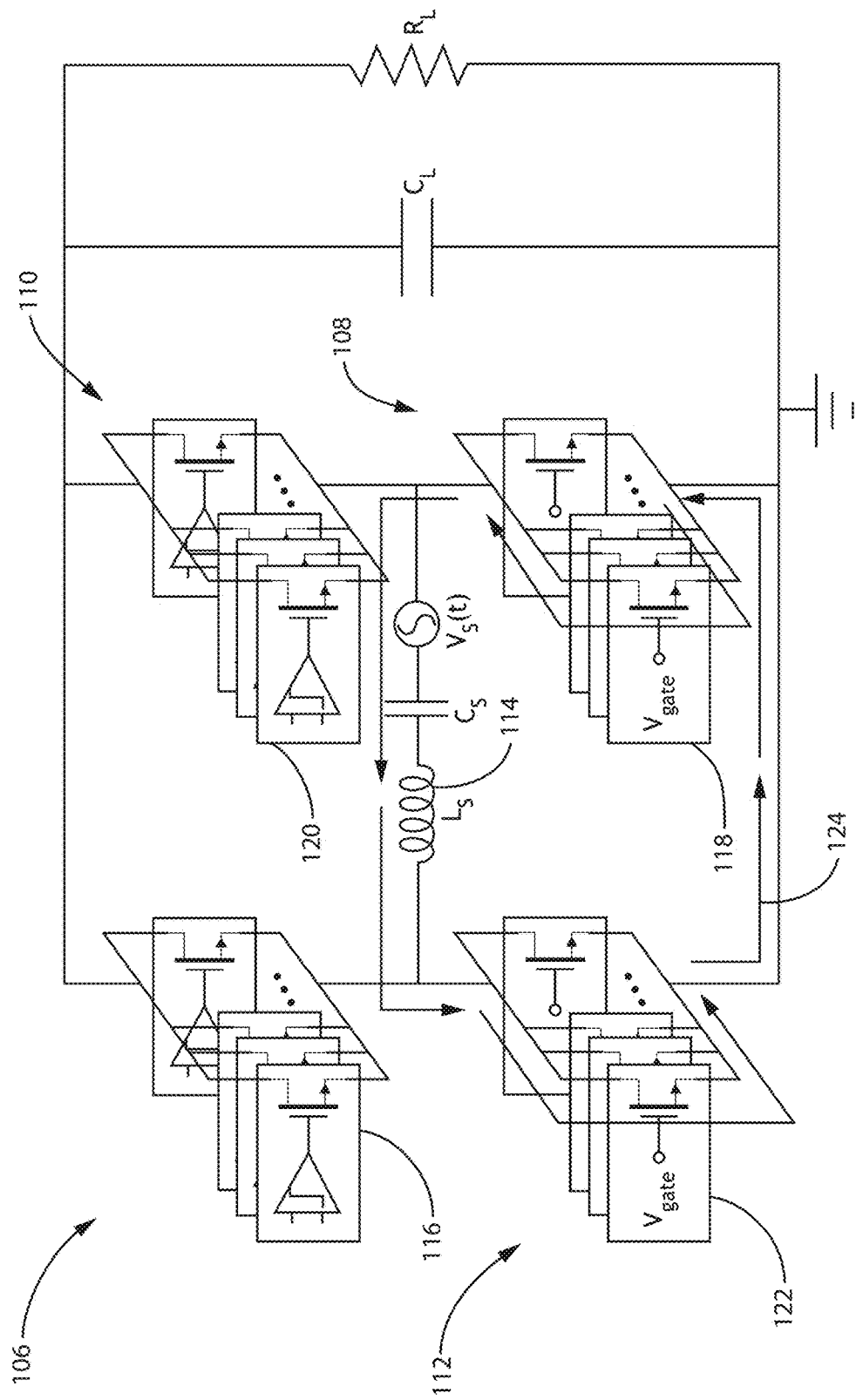
FIG. 1 shows a block diagram of a rectifier according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for modulating a signal in a rectifier by turning on a low side field effect transistor to produce a load at a coil network in response to a low side field effect transistor in an alternative diagonal being on. The system measures signal quality to determine a necessary modulation depth for ASK communication; then determines a switching time and magnitude of a ballast signal to apply to the low side field effect transistor to achieve that modulation depth.

Referring to FIG. 1, a block diagram of a rectifier according to an exemplary embodiment is shown. In order to enable data communication in wireless power transfer systems, load modulation may occur simultaneously with a power signal; a carrier signal may be present for modulation.

A rectifier in a wireless power transfer system includes field effect transistors (FETs) 116, 118, 120, 122 that switch (e.g., receive a signal at the gate to set the state of the FET 116, 118, 120, 122 as either conducting or non-conducting) according to the carrier signal to produce a rectified voltage ($V_{RECT}$). The rectifier (e.g., controlled or uncontrolled) may be any device that may convert alternating current to direct current. A FET (e.g., Junction FET, Metal-Oxide Semiconductor FET, or Insulated-Gate FET) is a type of transistor that may be used for weak-signal amplification (e.g., amplifying wireless signals). During normal operation, FETs 116, 118, 120, 122 are placed in a conducting state by current comparators. Generally, diagonal FETs 116, 118, 120, 122 (for example, a first diagonal including a first high side FET 116 and a first low side FET 118, and a second diagonal including a second high side FET 120 and a second low side FET 122) are either conducting or non-conducting at the same time; for example, the first high side FET 116 and first low side FET 118 are conducting while the second high side FET 120 and second low side FET 122 are non-conducting. It may be appreciated that high side FETs 116, 120 may be those FETs in the diagonal disposed and configured for current to travel from the supply of the FET to the load. Low side FETs 118, 122 may those FETs in the diagonal disposed and configured for current to travel from the load to ground.

In at least one embodiment, the rectifier may be configured to alter the conducting state of one or more FETs 116, 118, 120, 122; for example, when the first high side FET 116 and the first low side FET 118 are conducting, the second low side FET 122 may be switched on (e.g., conducting) to apply a current 124 from a coil 114 (e.g., field coil) to ground. The signals to control such conduction may modulate the carrier signal for ASK data communication. Alternatively, a resistance may be applied from the coil 114 to ground to achieve a similar result. In at least one embodiment, the modulation may be characterized by the amount of time that both of the low side FETs 118, 122 are conducting; wherein that amount of time may be less than the switching time of the rectifier ordinarily produced by the carrier signal. In at least one embodiment, the rectifier varies the current or resistance in both the low side FETs 118, 122, or the overlapping pulse width, in response to both the low side FETs 118, 122 being conducting.

In at least one embodiment, some rectifiers may include the FETs 116, 118, 120, 122 organized into sets 106, 108, 110, 112 of FETs, wherein a first set of high side FETs 106 includes a plurality of individual FETs 116 in parallel. Likewise, a second set of high side FETs 110, a first set of low side FETs 108, and a second set of low side FETs 112 also each include a plurality of individual FETs 118, 120, 122 in parallel within their respective sets 108, 110, 112. In at least one embodiment, a single FET 122 or some subset of the second set of low side FETs 112 may be switched to control the gate voltage and produce a desired amount of load.

In one example, where there may be a high voltage at one set of the high side FETs 106 and a low voltage at one set of the low side FETs 108, both the set of high side FETs 106 and the set of low side FETs 108 are in a conducting mode (e.g., the FETs are turned on). During that conduction, a ballast signal turns on (e.g., weakly turns on) the second set of low side FETs 112 to conduct current from a node between the first set of high side FETs 106 and the second set of low side FETs 112 to ground; effectively applying a load to the coil 114 from the second set of low side FETs 112, up to ground. A typical load may be in the range of 50 to 100 milliamps. It may be appreciated that in the context of the present disclosure, ballast signal refers to a signal applied to one or more FETs 116, 118, 120, 122, that would otherwise be in a non-conducting state, to cause those FETs 116, 118, 120, 122 to conduct current from a node to ground.

Figure 2:
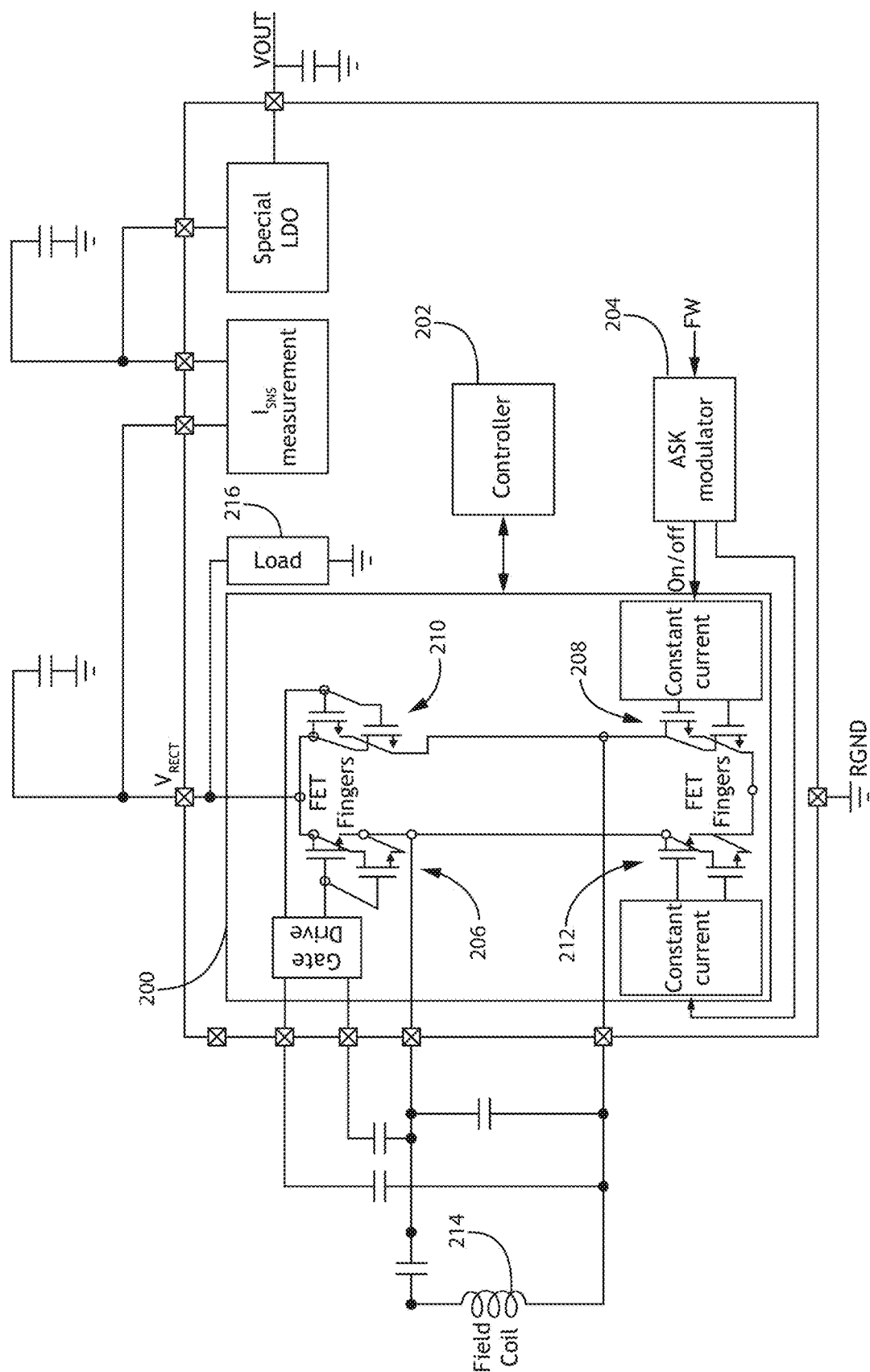
FIG. 2 shows a block diagram of a system according to an exemplary embodiment.

Referring to FIG. 2, a block diagram of a system according to an exemplary embodiment is shown. A rectifier 200 may include a controller 202 or control logic (such as a state machine, field programmable gate array, programmable processor, or the like) associated with one or more FETs 206, 208, 210, 212. In at least one embodiment, the controller 202 may be configured to alter the conducting state of the one or more FETs 206, 208, 210, 212; for example, the controller 202 may be configured to switch one or more low side FETs 208, 212 to be conducting in response to a corresponding high side FETs 206, 210 being conducting.

In one example, where there may be a high voltage at one set of high side FETs 206 and a low voltage at one set of low side FETS 208, both the set of high side FETs 206 and the set of low side FETs 208 are in a conducting mode (e.g., the FETs are turned on). During that conduction, the controller 202 also momentarily turns on (e.g., weakly turns on) a second set of low side FETs 212 to conduct current from a node to ground; effectively applying a load to the coil 214 from the second set of low side FETs 212, to ground. A typical load may be in the range of 50 to 100 milliamps.

Some rectifiers may include FETs organized into sets of FETs, wherein a first set of high side FETs 206 includes a plurality of individual FETs in parallel. Likewise, a second set of high side FETs 210, a first set of low side FETs 208 and a second set of low side FETs 212 also each include a plurality of individual FETs in parallel. In at least one embodiment, the controller 202 activates one or some subset of the second set of low side FETs 212 to control the gate voltage and produce a desired amount of load. In at least one embodiment, the controller 202 varies the current or resistance in the low side FETs 208, 212, or the overlapping pulse width, where both the low side FETs 208, 212 are conducting.

Data communication, such as ASK data communication, in wireless power transfer systems requires modulation depth for fast, accurate communication. Modulation depth refers to a ratio of unmodulated carrier signal amplitude to the amplitude deviation for which the modulated carrier signal reaches a threshold, minimum value (e.g., a modulated carrier signal amplitude divided by an unmodulated carrier signal amplitude). The amount of modulation depth needed may be a function of noise, and noise is, at least partially, a function of power. As wireless power transfer systems increase in power, data communication via the power transfer link becomes noisier, requiring greater modulation depth.

An ASK modulator 204 may apply ballast signals to one or more low side FETs 208, 212 according to a desired modulation. In at least one embodiment, modulation depth may be dynamically adjustable. For example, a measurement from a device receiving the ASK modulated signal (such as a signal-to-noise ratio (SNR) measurement, a bit-error rate (BER) measurement, a parity error rate measurement, or the like) may be used to increase or decrease modulation depth. In at least one embodiment, the controller 202 may determine a number of low side FETs 208, 212 to turn on, or a magnitude to turn them on, based on a signal quality metric, such as an SNR measurement, to provide dynamic modulation depth for ASK.

Furthermore, the controller 202 may determine a modulation depth with respect to signal quality metrics such as $V_{RECT}$ fidelity or the quality of a carrier signal oscillator ($F_{CLK}$). $V_{RECT}$ fidelity may be determined by the controller 202 as a function of high frequency oscillations in $V_{RECT}$; and $F_{CLK}$ fidelity may be determined by the controller 202 with reference to a known, good oscillator, or to switching times in the FETs 206, 208, 210, 212. Such determinations may be with reference to measurements, such as instantaneous or accumulated over time into a mean error, root mean square error, variance, trend, or the like). The controller 202 may also measure the down converted signal from the coil 214 to produce an estimate of noise used for ASK.

Figure 3:
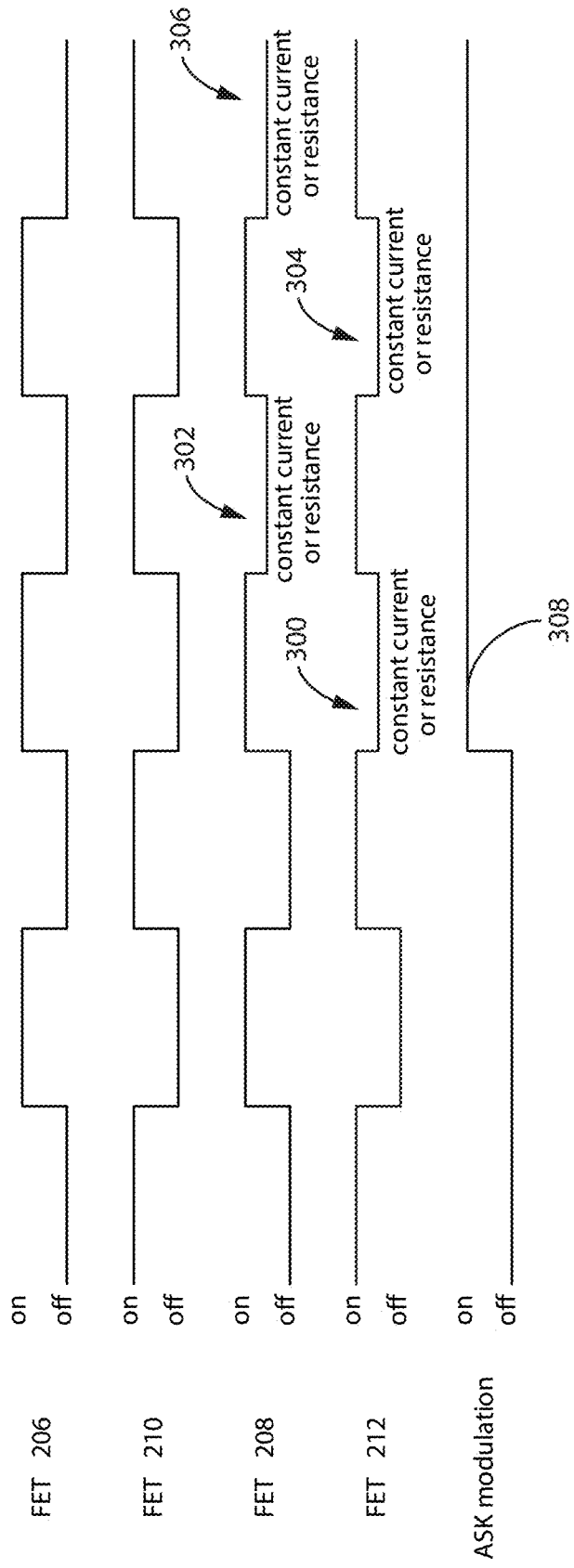
FIG. 3 shows graphs of on and off times for FETs in the presence of ASK modulation.

In at least one embodiment, when both sets of low side FETs 208, 212 are conducting, impedance from a receiver is changed. Turning on both sets of the low side FETs 208, 212 for a period of time (for example, half a millisecond) sets ASK to one level; turning off one set of the low side FETs 208, 212 sets ASK to another level. For example, FIG. 3 shows graphs of on and off times for each FET 206, 208, 210, 212 in the presence of ASK modulation 308. During periods of ASK modulation, each low side FET 208, 212 may be placed in a state of constant current or constant resistance 300, 302, 304, 306. The states of constant current or constant resistance 300, 302, 304, 306 may coincide with periods where the low side FETs 208, 212 would otherwise be "off".

In at least one embodiment, in order to mitigate any electromagnetic interference, the controller 202 may alternate cycles. For example, during a first cycle, the low side FETs 208, 212 are controlled to apply a load to the coil 214; during a second cycle, the high side FETs 206, 210 are controlled to apply a load to the coil 214. It may be appreciated that while exemplary embodiments described herein are specifically directed to conducting with the low side FETs 208, 212, the principles are also applicable to the high side FETs 206, 210.

In at least one embodiment, the controller 202 may disable low side FET conduction for signal modulation. Temporarily disabling low side FET conduction may be desirable to establish rectifier signal quality without interference, or to adjust parameters to the rectifier such as switching current thresholds ($I_{LIM}$), rectifier gain, continuous conduction mode, or the like.

The application of a load at the input of the rectifier may also enable over voltage protection. When a voltage on $V_{RECT}$ has exceeded some predefined threshold, some rectifier input load may be applied until $V_{RECT}$ falls below that predefined threshold. Furthermore, temperature monitoring may also be used to determine when chip temperature is also below a threshold. Such threshold monitoring may prevent over voltage. Modulation on the input of the rectifier allows for communication at a rate greater than the carrier frequency with multiple pulses per cycle duration.

In at least one embodiment, the controller 202 may apply a modulation load and any extra load for over voltage protection simultaneously via one or more individual, parallel FETs within the low side FETs 212, 208. Alternatively, or in addition, a load 216 may be placed on the rectifier output to apply a modulation on the rectifier input and over voltage load on the rectifier output. In at least one embodiment, a rectifier input load may comprise complex waveforms such as ramping to counteract electromagnetic interference.

Switching with momentary low side FET conduction is fast as compared to load modulation on $V_{RECT}$, so ASK communication may be fast; existing systems with conventional modems operate at about a 2K baud rate while embodiments of the present disclosure may enable 10K or 20K baud rates. Furthermore, because embodiments employ resistive switching, the system avoids the limitations of capacitive switching; furthermore, it is possible to easily change the modulation strength so that modulation depth can be programmed. Also, resistive modulation works for any frequency. In multi-band systems using capacitive modulation, the system only works well for a specific frequency band at any moment in time.

Embodiments of the present disclosure enable a fast load (e.g., a ballast device that is placed in series with a load to limit the amount of current in an electrical circuit) on the input of a rectifier. Rectifier FETs and/or additional FETs are configured to provide resistive switching. Utilizing FETs for resistive switching at the rectifier input allows for dynamic modification of modulation strength and is useful for multi-band applications.

Embodiments of the present disclosure enable fast ASK communications at high frequencies (e.g., baud rates); adjustable/programmable signal strength (e.g., higher voltages) based on a variety of conditions/environments; and multi-band communication.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A rectifier comprising:
   a first high side field effect transistor (FET);
   a second high side FET;
   a first low side FET;
   a second low side FET;
   a second set of low side FETs, wherein the second low side FET is in the second set of low side FETs;
   a coil; and
   a controller,
   wherein:
     the first high side FET, the second high side FET, the first low side FET, and the second low side FET are configured to produce a rectified voltage ($V_{RECT}$) based on a carrier signal;
     the controller is configured to apply, in response to the first low side FET being on, a ballast signal to the second low side FET to produce a load at the coil, and the controller is further configured to:
       measure one or more signal quality metrics of the carrier signal;
       determine a modulation depth based on the one or more signal quality metrics; and
       determine a number of FETs in the second set of low side FETs to which the ballast signal is applied in order to achieve the determined modulation depth.

2. The rectifier of claim 1, further comprising an amplitude shift keying (ASK) modulator configured to:
   determine a signal modulation for ASK communication; and
   provide the signal modulation to the controller.

3. The rectifier of claim 1, further comprising:
   a first set of high side FETs, wherein the first high side FET is in the first set of high side FETs;
   a second set of high side FETs, wherein the second high side FET is in the second set of high side FETs; and a first set of low side FETs, wherein the first low side FET is in the first set of low side FETs.

4. The rectifier of claim 1, wherein the controller is configured to:
determine that the $V_{RECT}$ has exceeded a predefined voltage threshold; and
apply a modulation to a rectifier input via a load at a rectifier output.

5. The rectifier of claim 1, wherein the controller is further configured to apply, in response to the first low side FET being on, a ballast signal to the second high side FET to produce a load at the coil.

6. The rectifier of claim 1, wherein the controller is further configured to apply, in response to the first low side FET being on, a ballast signal to the first low side FET to produce a load at the coil.

7. A method comprising:
producing a rectified voltage ($V_{RECT}$) by placing a first high side field effect transistor (FET) and a first low side FET in a rectifier into a conducting state, and placing a second high side FET and a second low side FET into a non-conducting state, based on a carrier signal;
applying a ballast signal to the second low side FET to temporarily produce a load at a coil;
measuring one or more signal quality metrics of the carrier signal;
determining a modulation depth based on the one or more signal quality metrics; and
determining a number of FETs in a second set of low side FETs to apply the ballast signal in order to achieve the determined modulation depth, the second low side FET being one of a second set of low side FETs.

8. The method of claim 7, further comprising determining a signal modulation for ASK communication, wherein the ballast signal is configured to produce the modulation.

9. The method of claim 7, wherein:
the first high side FET is one of a first set of high side FETs;
the second high side FET is one of a second set of high side FETs; and
the first low side FET is one of a first set of low side FETs.

10. The method of claim 7, further comprising:
placing the first high side FET and the first low side FET in the rectifier into a non-conducting state based on the carrier signal;
placing the second high side FET and the second low side FET into a conducting state based on the carrier signal; and
applying a ballast signal to the first low side FET to temporarily produce a load at the coil.

11. The method of claim 7, further comprising:
placing the first high side FET and the first low side FET in the rectifier into a non-conducting state based on the carrier signal;
placing the second high side FET and the second low side FET into a conducting state based on the carrier signal; and
applying a ballast signal to the first high side FET to temporarily produce a load at the coil.

12. A wireless power transfer system comprising:
a rectifier having:
a first high side field effect transistor (FET);
a second high side FET;
a first low side FET;
a second low side FET;
a second set of low side FETs, wherein the second low side FET is in the second set of low side FETs; and
a coil; and
a controller,
wherein:
the first high side FET, the second high side FET, the first low side FET, and the second low side FET are configured to produce a rectified voltage ($V_{RECT}$) based on a carrier signal;
the controller is configured to apply, in response to the first low side FET being on, a ballast signal to the second low side FET to produce a load at the coil,
and the controller is further configured to:
measure one or more signal quality metrics of the carrier signal;
determine a modulation depth based on the one or more signal quality metrics; and
determine a number of FETs in the second set of low side FETs to apply the ballast signal in order to achieve the determined modulation depth.

13. The wireless power transfer system of claim 12, further comprising an amplitude shift keying (ASK) modulator configured to:
determine a signal modulation for ASK communication; and
provide the signal modulation to the controller.

14. The wireless power transfer system of claim 12, further comprising:
a first set of high side FETs, wherein the first high side FET is in the first set of high side FETs;
a second set of high side FETs, wherein the second high side FET is in the second set of high side FETs; and
a first set of low side FETs, wherein the first low side FET is in the first set of low side FETs.

15. The wireless power transfer system of claim 14, wherein the controller is configured to:
determine that the $V_{RECT}$ has exceeded a predefined voltage threshold; and
apply an input load to a rectifier input until $V_{RECT}$ falls below a predefined voltage threshold.

16. The wireless power transfer system of claim 15, wherein the controller is further configured to determine at least one FET in the first set of low side FETs, and apply the input load via the at least one FET.

17. The wireless power transfer system of claim 12, wherein the controller is further configured to apply, in response to the second low side FET being on, a ballast signal to the first low side FET to produce a load at the coil.

* * * * *